United States Patent [19]

Pedone

[11] 4,243,022
[45] Jan. 6, 1981

[54] SOLAR PICK-UP PANEL

[76] Inventor: Angelo Pedone, 13 Place Verte, Tournai, Belgium

[21] Appl. No.: 902,342

[22] Filed: May 3, 1978

[30] Foreign Application Priority Data

May 9, 1977 [IT] Italy ................................ 23357 A/77

[51] Int. Cl.³ ................................................. F24J 3/02
[52] U.S. Cl. ..................................... 126/449; 126/901; 126/446; 428/97
[58] Field of Search ................... 126/27, 270, 449, 417, 126/901, 446; 4/172.12; 428/97, 85, 409; 204/41

[56] References Cited

U.S. PATENT DOCUMENTS

| | | | |
|---|---|---|---|
| 3,072,920 | 1/1963 | Yellot | 126/271 X |
| 3,159,554 | 12/1964 | Mount | 126/271 X |
| 3,893,443 | 7/1975 | Smith | 126/271 |
| 3,984,882 | 10/1976 | Forman et al. | 126/271 X |
| 4,005,698 | 2/1977 | Cuomo et al. | 126/276 |
| 4,148,294 | 4/1979 | Scherber et al. | 126/449 |
| 4,176,035 | 11/1979 | Pedone | 204/41 X |

*Primary Examiner*—Carroll B. Dority, Jr.
*Assistant Examiner*—Larry Jones
*Attorney, Agent, or Firm*—Fisher, Christen & Sabol

[57] ABSTRACT

The invention relates to a solar pick-up comprising a panel and means associated with this panel, suitable for absorbing the solar radiation and for heating a fluid, wherein said means are constituted by a thin metal foil which covers virtually all the panel and which presents at least one first face exposed directly to the solar radiation, blackened and treated on the surface to pick up the solar radiation and a second face, opposite the first, in direct contact over virtually the whole of its surface with said fluid, said foil transmitting the picked-up heat to said fluid through its thickness.

9 Claims, 5 Drawing Figures

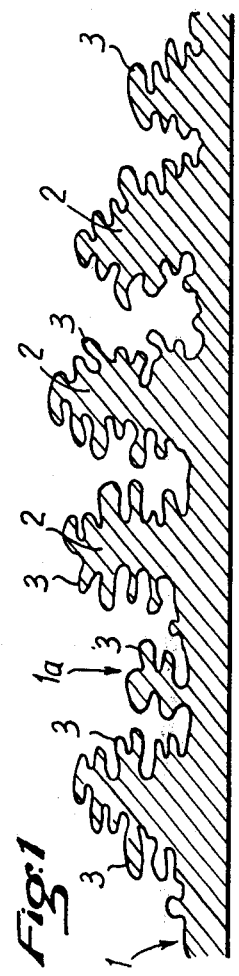
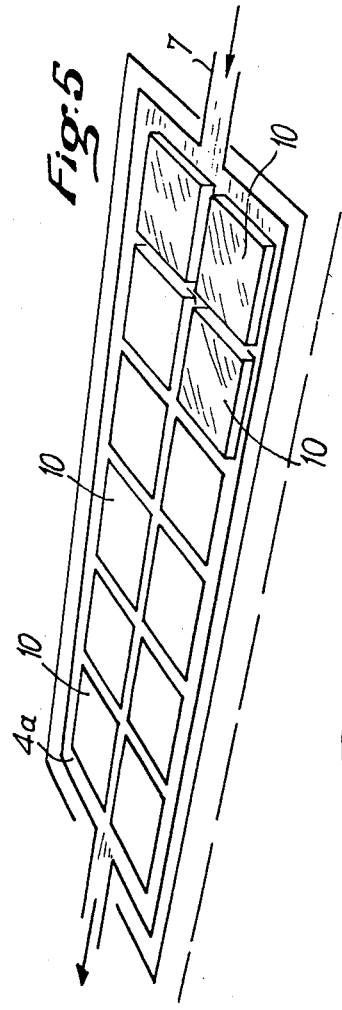
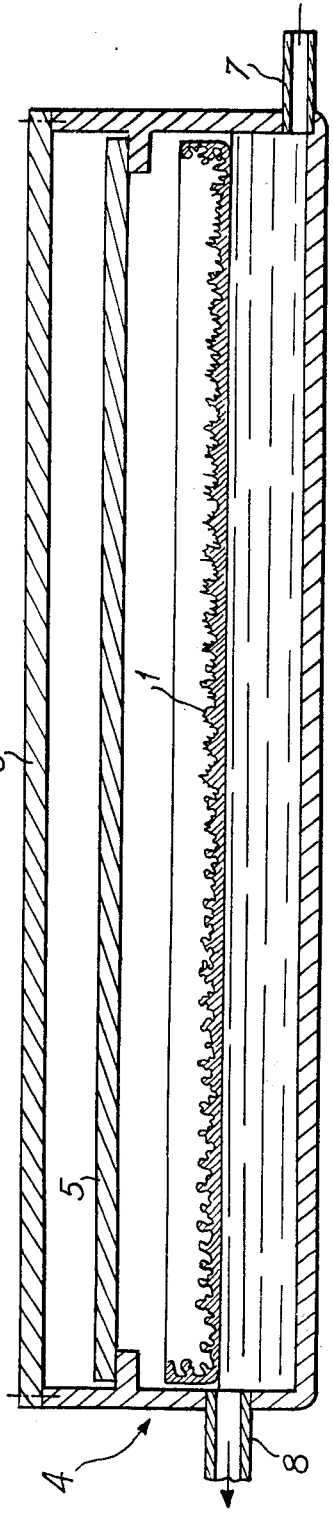

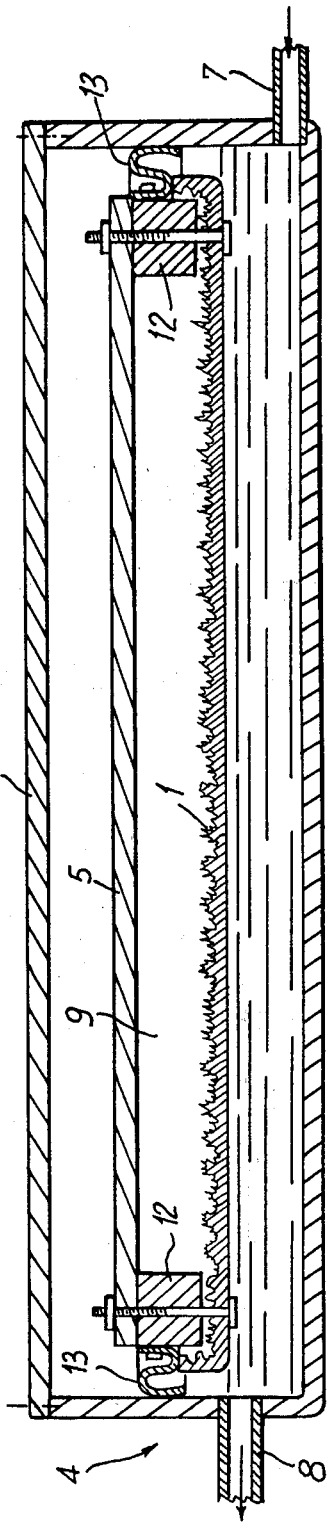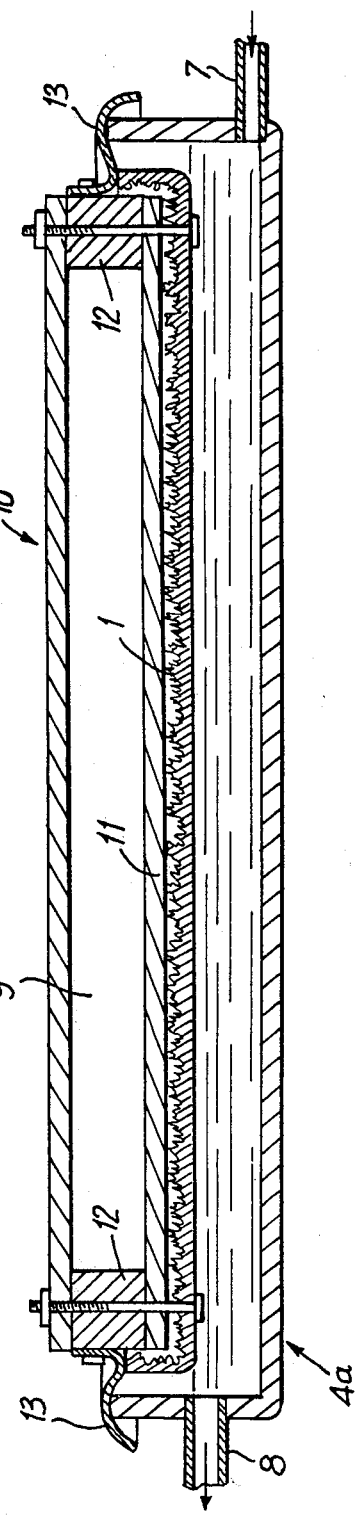

SOLAR PICK-UP PANEL

The present invention relates to a solar pick-up of improved construction, as well as to application thereof in the most diverse sectors where the solar energy is available and usable.

It is well-known that present energy needs are rendering it more and more necessary to make use of solar energy and in particular solar pick-ups composed of panels for heating dwellings and for supplying hot water.

At present, solar pick-ups are composed mainly of a bundle of pipes in which a fluid, normally water, circulates, a metal plate thermally connected to the bundle of pipes and blackened and a panel with insulated bottom and sides enclosing the thermally connected bundle and metal plate. The panel is closed in its upper part by a sheet of glass sparingly permeable to the radiations of high wave length emitted by the black plate, consequently creating a "glass house effect".

On these pick-ups, solar radiation is the stronger as the rays fall perpendicularly on the surface of the pick-up which is to receive them. This results in that, if the pick-up is to function for the whole year, it must be installed with an inclination with respect to the ground which is equal to the latitude. On the other hand, if the pick-up is to function only during a brief seasonal period, it should be oriented with the inclination equal to the latitude corrected by the mean solar declination of the period in question. The adaptation to the seasonal position of the sun always remains approximate, however, and is effected by making an average between the positions which the pick-up should gradually take to be perfectly facing the sun. In addition, and this is an even more important fact, the pick-ups remain in any case facing the sun with a certain exactitude, but only for a few hours each day, further to the rotating movement of the earth, unless it is desired to install mobile pick-ups capable of following the sun's movement, this naturally involving considerable structural complications and a considerable increase in the price of these pick-ups. It should also be emphasized that one of the reasons for the reduced efficiency of the known solar pick-ups resides in the relatively limited property of absorption of the metal plate on which the solar radiation is directed. In fact, this plate, although it is blackened, partly reflects the incident solar radiation and the at least partial lack of absorption thereof reduces the quantity of heat transmitted to the fluid circulating in the bundles of pipes. From this point of view, the yield or capacity of the blackened surface to absorb the solar radiations without reflecting or reflecting only a minimum part thereof, determines the yield of any solar pick-up.

The result of the above is that the presently known solar pick-ups, although they fulfill their task to a certain extent, still remain, even in their most simple version, relatively heavy, cumbersome and expensive, due to the presence of the elements such as the panel, the bundle of pipes and the metal plate and are also often of reduced efficiency particularly concerning the yield of the absorbent surface thermally connected to the bundle of pipes.

It is therefore an object of the present invention to remedy the above-mentioned drawbacks, at least partly, in order to increase the efficiency of the solar pick-ups in general and thus to supply a usable source of energy.

This object is attained by the solar pick-up according to the invention which comprises a panel and the means associated with this panel suitable for absorbing the solar radiation and heating a fluid, wherein said means are constituted by a very thin metal foil which covers virtually all the panel and which presents a first face, exposed directly to the solar radiation, blackened and treated on the surface to pick up the solar radiation and a second face, opposite the first, in direct contact over virtually the whole of its surface with said fluid, this thin foil transmitting the picked up heat to said fluid through its thickness.

The invention will be more readily understood on reading the following description with reference to the accompanying drawings, in which:

FIG. 1 is an enlarged section of a detail of the pick-up according to the invention.

FIGS. 2 to 4 show embodiments of the whole pick-up, seen in section; and

FIG. 5 shows a possible application of a pick-up according to the invention.

With reference to the drawings, the solar pick-up according to the invention comprises, as characteristic element, a thin metal foil, preferably made of copper, treated on the surface and blackened, and one face of which is exposed directly to the sun's radiation and the other face is in contact, virtually over its whole surface, with a fluid to be heated, for example, water. The thin copper foil, indicated by reference 1, is shown in partial transverse section and greatly enlarged in FIG. 1, where it may be noted that this foil 1 advantageously presents on the first face 1a exposed to the sun and blackened, an absorbent surface which is considerably indented, defined by a plurality of primary reliefs 2 from which emerge other secondary reliefs 3 which, as a whole, render the absorbent surface of the copper foil 1 very distorted and irregular and the ratio of its actual surface of absorption compared with the surface of its projection along its own plane of development is very high.

These indentations or dendrites are obtained by means of electro-deposited metal by a process such as disclosed and claimed in my copending U.S. application Ser. No. 903,120, filed May 5, 1978, and also disclosed in my corresponding Belgian application No. 854,450, filed May 10, 1977 and published Sept. 1, 1977. This process comprises the immersion of the lower portion of an endless belt of electrically conductive material in a single tank of an electrolytic solution of the metal to be deposited. During the initial travel of the belt in the solution the metal is deposited on the belt by maintaining an electrical potential between the belt and one or more electrodes all having the same polarity. During the latter portion of the passage of the belt through the same solution, several successive electrodes are provided in the solution to allow the establishment of several successive reversals of polarity to which the solution is subjected in order to build up a dendritic surface on the side of the deposited sheet, or foil, exposed to the solution. The other side of the sheet, or foil, takes on the surface configuration of the endless belt before it is stripped off at the downstream end. Following that the sheet, or foil, may be introduced into a second tank of electrolytic solution of another metal which can be then applied by electro-deposition in a very thin layer which does not destroy the previously produced dendritic surface but provides some protection. Said Belgian application Ser. No. 854,450 is incorporated herein by reference.

For example, the electrodeposited copper may be enriched on the surface with complementary copper or zinc, nickel or chromium in a plurality of successive phases, so as to obtain either primary reliefs 2 or secondary reliefs 3 growing on the primary reliefs. Both may then be covered with a protective layer, also metallic, this preventing cracking thereof, without varying the structure, and finally, coated by means of a metallochrome operation with a thin black layer.

However, it is preferable to use the copper foils obtained by means of electrodeposition which already have a dendritic or indented structure. This indentation may be more or less accentuated in the course of the phase of production of the copper itself.

The absorbent surface produced in this manner on the first face of the foil 1 presents specific particularities of fundamental importance concerning the absorption of the solar radiation: the blackening associated with the extreme irregularity of the surface and the fact that the modules, the dendrites and the metal layers superposed on the copper, with primary reliefs 2 and secondary reliefs 3 already mentioned, exceptionally increase the available pick-up surface, this resulting in the incident solar rays being entirely absorbed because, even if they are initially reflected, they undergo a fresh refraction, several times successively between the identations of the foil itself until they are totally absorbed. This capacity of the foil 1 to be able thus to absorb the rays which itself has already initially reflected is made use of and this is a supplementary advantage, virtually for any inclination of the incident rays.

This copper foil with the blackened dendrites represents virtually the maximum of the "black body", not only for the geometrical characteristics of its surface but also for the very high thermal conductivity of the copper, or preferably of the electro-deposited copper and immediately transmits the heat received to the fluid located underneath, thus avoiding reheating and reducing its capacity of absorption.

On the side opposite the first face 1a, the foil 1 presents a second face 1b which may be substantially smooth and which is advantageously in direct and continuous contact with the fluid to be heated. It is possible, in view of the extreme lightness of the foil 1, to effect a particularly original positioning of the foil with respect to the fluid to be heated, by allowing the foil 1 to float directly on the fluid.

A few non-limiting embodiments of pick-ups with a foil 1 directly floating on the fluid to be heated are illustrated in FIGS. 2 to 4. The pick-ups are schematically shown therein in transverse section. In particular, FIG. 2 shows a pick-up which comprises on the outside a panel or box-like body 4 provided, corresponding to a main face, with a first transparent covering 5 such as a pane of glass or transparent plastic material capable of creating a "glass house effect" between itself and the foil 1 and a second covering 6 of the same nature placed externally with respect to the first covering 5 to increase this "glass house effect".

The foil 1 is in direct abutment on the fluid to be heated and has been folded and raised at the edges to form a sort of tray and increase its floatability. The water or other fluid in the panel 4 is introduced beneath the foil 1 through an inlet pipe 7 and is then evacuated via an outlet pipe 8. These pipes are respectively located near the bottom of the layer of fluid and the surface of the foil in order to facilitate stratification of the fluid which is cold at the bottom and hot at the top beneath the foil 1 and at the level of the output pipe 8. It is thus possible to withdraw, from the panel 4, water at a very high temperature or at least at a temperature higher than that which would otherwise result from mixing the water inside the panel.

The foil 1 may obviously always be inserted inside the panel 4, in contact with a transparent support capable of preventing the infiltrations of the fluid to be heated, at the level of the absorbent surface on the indentation side, or directly connected for example to the first transparent covering 5.

FIG. 3 shows another panel 4, similar to that of FIG. 2, in which, however, the first transparent covering 5 is fast with the foil 1 so as to form therewith a tight space 9. This is obtained by disposing on the edges of the first covering 5 a frame 12 made of wood, plastic, glass or any other material, which is preferably transparent but also may be opaque, and fixing this small frame by suitable means, on the opposite parts of the first covering 5, as well as on the foil 1.

On the small frame 12, deformable projecting flanges 13 may advantageously be fixed on the outer edges. In practice, these flanges ensure the complete covering of the heated fluid as they compensate for the slight fluctuations of the floating foil 1 and avoid the dispersion of the steam and heat which form at the level of the zones where the fluid is in the open air.

FIG. 4 illustrates a development of the inventive idea shown in FIGS. 2 and 3. The panel 4 indicated by reference 4a, is deprived of the covering means, like the second transparent covering 6 of FIG. 3, and it is formed solely of a sort of tank where the inlet and outlets 7 and 8 are introduced. In this tank-like panel 4a is introduced a floating plate 10 which may take the shapes already shown in FIG. 3, or which may present a transparent support 11 in direct contact with the foil 1 and also a second, superposed transparent covering, fast with but separable from the first transparent covering 5. The transparent support 11, which forms the tight space 9 with the first covering 5, may, for example, be constituted by a supplementary transparent covering. The foil 1 is fixed in adherent manner in any way to the outer part of the transparent support 11.

The panel 4a is shown in FIG. 4 with dimensions in plan approximately the same as the dimensions in plan of plate 10, but in fact the panel 4a may have any dimensions, even larger than plate 10, as is illustrated for example in FIG. 5, where the panel 4a has been enlarged until it forms a sort of tank in which a plurality of plates 10 are introduced, which for a large part cover the free surface of the water in the tank. The inlet and outlet pipes 7 and 8 may be formed by channels in which the water or other fluid circulates. An advantage associated with the solar pick-ups shown, which is particularly illustrated in FIG. 5, is the fact that the water may circulate from the inlet pipe 7 to the outlet pipe 8, not only by the action of pumps of any type, but also simply by the presence of a difference in level which causes the fluid to circulate by natural flow, thus clearly simplifying the structure of the pick-up.

The technical problem described in the preamble is effectively solved by the pick-up according to the present invention. In fact, the foil 1 does not present simply a surface of absorption with respect to the first side 1a, able to intercept virtually all the incident solar radiation, at any inclination, but also, by its conformation which gives lightness and continuity, may float on the fluid to be heated, this having for its consequence considerable structural simplifications in the solar pick-up and the adaptability thereof to numerous novel uses, not provided for previously for the known solar pick-ups. For example, it is possible to produce heated tanks as indicated in FIG. 5, or cover simple asphalt channels with plates 10, disposed independently of one another or assembled but not attached for a greater ease of introduction or removal. The plates 10, which are none other than a portion of the pick-up of the present invention, in which the panel 4a is formed by the tank which contains said plates, are extremely light, simple and longwearing elements. The possibility of causing water or another fluid to circulate in the tank by simple, natural flow enables this pick-up to be placed in spots which are totally deprived of technological or auxiliary infrastructures.

The invention designed in this manner may be subject to numerous modifications and variants, without departing from the scope thereof. Thus, for example, the transparent coverings used may be of any form, particularly convex like a magnifying glass. Moreover, auxiliary mirrors may also be provided which provoke a reverberation of the sun's rays on a solar pick-up according to the invention, which would then fulfill the functions of a boiler.

In particular, the solar pick-up according to the present invention may also be transparent with respect to the bottom of the panel 4 which contains the fluid to be heated and be disposed above a bright surface which reflects the solar radiation onto said bottom. The sides of the panel 4 through which the light does not directly pass could on the other hand be entirely specular to avoid dispersions.

According to another advantageous variant, the copper foil may be folded and corrugated in the direction of the fluid to be heated in order to increase the contact surface between the foil and the fluid. For example, the copper foil may be folded at regular intervals so as to form inclined fins which descend into the fluid, said fins preferably being inclined in the direction of movement of the fluid in order not to hinder said movement.

In addition, all the elements described may be replaced by technically equivalent elements, particularly made of a material other than that specified.

In practice, the dimensions may vary depending on needs.

What we claim is:

1. A solar pick-up comprising a body of fluid and a thin sheet, or foil, for conductively transferring solar energy directly to said fluid, said thin metal sheet, or foil, having an arborescent dendritic surface configuration having primary and secondary reliefs on one side, said arborescent dendritic surface being provided with a heat-absorptive coating to be exposed to solar energy, the opposite side of the sheet, or foil, being in direct contact over virtually the whole of its surface with said fluid, said sheet, or foil, being self-supporting, impermeable to said fluid and being substantially entirely formed by electro-deposition of thermally-conductive metal whereby heat absorption is substantially unaffected by the angle of incident light.

2. A solar pick-up as claimed in claim 1, wherein the sheet or foil, due to its indentation, presents a much greater surface of absorption than its projection along its own plane of development.

3. A solar pick-up as claimed in claim 1, wherein a first face of the foil faces at least one first transparent covering forming a glass house effect and a second face is in contact with a continuous and relatively thin layer of said fluid.

4. A solar pick-up as claimed in claim 3, wherein said sheet, or foil and at least said first transparent covering form a floating plate in a tank of water and this plate is associated with a plurality of similar, essentially independent plates floating in said tank.

5. A solar pick-up as claimed in claim 3, wherein said sheet, or foil floats on said fluid.

6. A solar pick-up as claimed in claim 5, wherein said sheet, or foil is fast with and parallel to at least said first transparent covering forming a glass house effect and floats therewith on said fluid, forming between the foil and said first transparent covering a closed space.

7. A solar pick-up as defined in claim 1, wherein said first mentioned sheet, or foil, comprises copper, and also includes another metal electrodeposited on said dendritic surface below said heat-absorptive coating, said dendritic surface being retained in the final product.

8. A solar pick-up as claimed in claim 7, wherein said copper sheet, or foil is applied to a transparent support on the dendritic surface and said copper foil floats with said first transparent covering and with this transparent support on said fluid.

9. A solar pick-up as defined in claim 1, wherein said metal sheet, or foil, comprises copper.

* * * * *